United States Patent
Cooley

(10) Patent No.: US 10,110,660 B2
(45) Date of Patent: Oct. 23, 2018

(54) INSTANT FILE UPLOAD TO A COLLABORATION SERVICE BY QUERYING FILE STORAGE SYSTEMS THAT ARE BOTH INTERNAL AND EXTERNAL TO THE COLLABORATION SERVICE

(71) Applicant: Cisco Technology, Inc., San Jose, CA (US)

(72) Inventor: Shaun Cooley, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 280 days.

(21) Appl. No.: 14/691,112

(22) Filed: Apr. 20, 2015

(65) Prior Publication Data

US 2016/0308941 A1 Oct. 20, 2016

(51) Int. Cl.
*G06F 17/30* (2006.01)
*H04L 29/08* (2006.01)

(52) U.S. Cl.
CPC ........ *H04L 67/06* (2013.01); *G06F 17/30067* (2013.01)

(58) Field of Classification Search
CPC ........... G06F 17/30067; G06F 17/3015; G06F 17/30097; G06F 17/30174; H04L 67/06
See application file for complete search history.

(56) References Cited

U.S. PATENT DOCUMENTS

| | | | | |
|---|---|---|---|---|
| 5,918,244 | A * | 6/1999 | Percival | G06F 12/0813 709/204 |
| 7,565,423 | B1 * | 7/2009 | Fredricksen | H04L 29/12066 709/203 |
| 7,783,600 | B1 * | 8/2010 | Spertus | G06F 11/10 707/610 |
| 8,271,574 | B1 * | 9/2012 | Srinivasan | G06Q 10/101 709/201 |
| 8,903,838 | B2 | 12/2014 | Hunter et al. | |
| 2002/0107877 | A1 * | 8/2002 | Whiting | G06F 11/1453 |
| 2007/0250506 | A1 * | 10/2007 | Stevens | G06Q 10/10 |
| 2008/0034091 | A1 * | 2/2008 | Gaya | G06F 21/604 709/225 |
| 2008/0319867 | A1 * | 12/2008 | Rosenberg | G06Q 20/12 705/26.41 |
| 2010/0332456 | A1 * | 12/2010 | Prahlad | G06F 17/30082 707/664 |

(Continued)

*Primary Examiner* — Edward Kim
(74) *Attorney, Agent, or Firm* — Edell, Shapiro & Finnan, LLC

(57) ABSTRACT

Techniques are presented herein for receiving a hash value of a file computed by a collaboration client prior to the collaboration client uploading the file to a collaboration server in an attempt to share the file with another collaboration client. The collaboration server may query an internal file storage system of file hashes for a hash value of a previously uploaded file that matches the hash value of the file to be uploaded. In response to the collaboration server receiving a notification that a matching hash value was not found in the file storage system, the collaboration server queries a first connector service that is in communication with a first service that has access to at least a first file storage system that is external to the collaboration server. The collaboration server queries the first connector service with the hash value of the file to be uploaded.

20 Claims, 4 Drawing Sheets

(56) References Cited

U.S. PATENT DOCUMENTS

| | | | |
|---|---|---|---|
| 2012/0095958 A1* | 4/2012 | Pereira | G06F 17/30029 707/609 |
| 2013/0159467 A1* | 6/2013 | Lundholm | H04L 65/00 709/219 |
| 2014/0025699 A1* | 1/2014 | Mallinson | G06F 17/30026 707/758 |
| 2014/0040412 A1* | 2/2014 | Yanagihara | H04L 67/2842 709/213 |
| 2014/0122451 A1 | 5/2014 | Euresti et al. | |
| 2014/0181057 A1 | 6/2014 | Euresti et al. | |
| 2014/0280493 A1* | 9/2014 | Ortiz Rodriguez | G06F 15/167 709/203 |
| 2015/0100366 A1* | 4/2015 | Hollis | G06Q 10/06313 705/7.23 |
| 2015/0212900 A1* | 7/2015 | Hayasaka | G06F 11/1453 707/652 |

\* cited by examiner

INSTANT FILE UPLOAD TO A COLLABORATION SERVICE BY QUERYING FILE STORAGE SYSTEMS THAT ARE BOTH INTERNAL AND EXTERNAL TO THE COLLABORATION SERVICE

TECHNICAL FIELD

The present disclosure relates to file sharing over collaboration platforms.

BACKGROUND

Collaboration services (e.g., WebEx®, Cisco Jabber®, Citrix GoToMeeting®, Skype®, Microsoft SharePoint®, Microsoft Lync®, Google Drive®, etc.) are systems utilized by multiple users to achieve a common goal, such as sharing ideas, working on a project, and communicating with remote users. In today's global economy, collaboration platforms are essential for enterprises to connect employees, especially personnel that are unable to meet in person. One of the cornerstones to any collaboration platform is file sharing between users of a collaboration session. Often, when a first user wishes to share a file with a second user via the collaboration service, the first user will upload the file to the collaboration server that manages the collaboration service. Once the file is uploaded to the collaboration server, the second user is instructed by the server when they can download or view the uploaded file.

Many collaboration services promote file sharing and file backup services as a major component of the collaboration platform, but file sharing over the collaboration services remains a cumbersome experience for the users of the collaboration service and a major consumer of bandwidth. For many collaboration services, when a first user wishes to share a file with a second user, the first user uploads the file via the collaboration service to a server. Once the uploaded file is complete, the file is then stored on the collaboration service server and the second user is notified that the uploaded file is available to be downloaded or viewed. However, these collaboration services never verify whether or not the newly uploaded file had previously been uploaded to, and is currently being stored on, the collaboration server. Thus, duplicate files are often stored on the collaboration server of the collaboration service. In this scenario, storage space on the server is occupied when it does not need to be occupied. Furthermore, bandwidth was utilized to upload the file to the collaboration server when the upload did not need to occur.

Some collaboration services will perform an internal data deduplication process when a user attempts to upload a file before the uploading has actually taken place. This prevents duplicate files from being uploaded to the server of the collaboration service. However, files that are to be uploaded to the collaboration server are often already stored on a file storage system external to the collaboration service. Many user devices run several different services, and each of these services may have its own file storage system. Therefore, there is a strong likelihood that the file to be uploaded to the collaboration server has already been stored on a file storage system of another service being operated on the user device. Thus, it is not necessary to utilize the bandwidth and storage space of the collaboration server when the files may be accessed from one of the file storage systems external to the collaboration service.

DESCRIPTION OF EXAMPLE EMBODIMENTS

Overview

Techniques are presented herein for file sharing in a collaboration environment. A hash value of a file is computed by a first collaboration client prior to the first collaboration client uploading the file to a collaboration server in an attempt to share the file with at least a second collaboration client. The collaboration server may query a file storage system of file hashes that is accessible to the collaboration server for a hash value of a previously uploaded file that matches the hash value of the file to be uploaded by the first collaboration client. In response to the collaboration server receiving a notification that a matching hash value was not found in the file storage system, the collaboration server queries a first connector service that is in communication with a first service that has access to at least a first file storage system that is external to the collaboration server. The collaboration server queries the first connector service with the hash value of the file to be uploaded.

The techniques presented herein provide a seemingly "instant" file upload to a collaboration service by providing both internal enterprise-wide de-duplication and by searching external enterprise services that include file storage systems. In the event that querying internal file storage systems and external file storage systems of external enterprise services for a hash value of a previously uploaded file identifies a file with a matching hash value to that of the file to be uploaded by the first collaboration client, the collaboration service prevents the upload of the file by the first collaboration client. The user of the first collaboration client is notified that the upload of the file was "instant," or "complete," despite the file not actually being uploaded. The at least second collaboration client is provided with prompts that enable the at least second collaboration client to fetch the data of the previously uploaded file, which may be located on an external file storage system. The presentation of the file upload process and file download process to the users of the collaboration service may not differ between a normal file upload process and an "instant" file upload process. However, the users of the collaboration service may notice that the file sharing is completed more rapidly when the collaboration service performs an "instant" file upload process.

Example Embodiments

Figure 1:
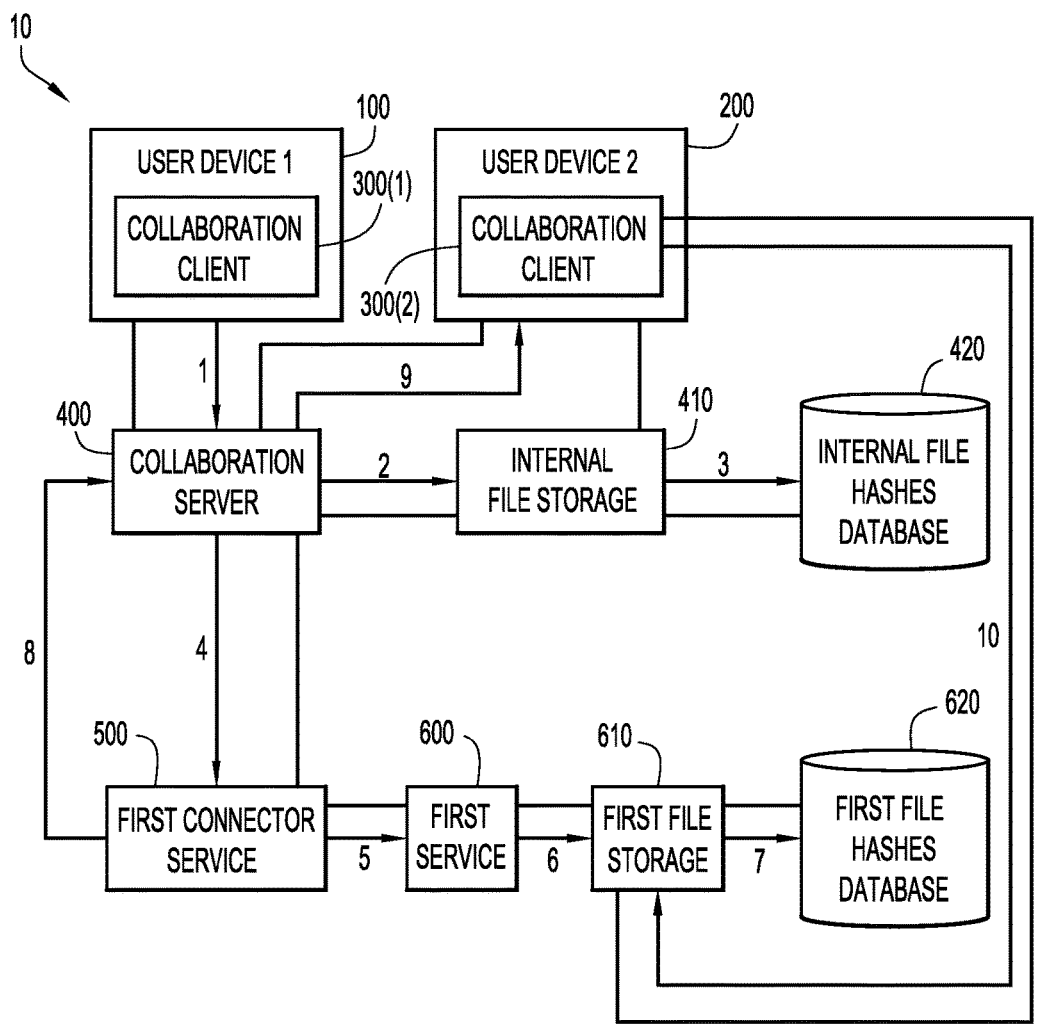
FIG. 1 is a schematic block diagram of an environment including a collaboration service and showing a communication flow for file sharing according to a first example embodiment.

Referring first to FIG. 1, a first example embodiment of a collaboration environment/system is shown at reference numeral 10. The system 10 includes a first user device 100 and a second user device 200. The first user device runs a collaboration client 300(1) and the second user device runs a collaboration client 300(2). The system 10 further includes a collaboration server 400 that is in communication with an internal file storage 410 that includes a file hashes database 420 that contains file hashes for files that are currently stored by the internal file storage 410. The collaboration server 400 is further in communication with a first connector service 500 that is in turn in communication with a first service 600 (also referred to as a "cooperating service"). The first service 600 is in communication with a first file storage 610 that includes a file hashes database 620 that contains file hashes for files that are currently stored by the first file storage 610. The first file storage 610 and first file hashes database 620 are external to the collaboration server 400. The collaboration system 10 enables users/participants, via their user devices 100, 200, to establish communication with one another. Such communication may include comprise one or more types of real-time communications (e.g., audio and/or video, instant messages, online/web-based conferences, etc.), email communications, as well as sharing of files or any other types of content between participants. In the example of FIG. 1, collaboration client 300(1) need not be the same as collaboration client 300(2).

The collaboration server 400 (described in further detail below in connection with FIG. 4) hosts and supports communications and exchange of content between user devices 100, 200. Some examples of user devices 100, 200 include any suitable types of computing devices including, without limitation, personal computer (PC) devices, such as stationary (e.g., desktop) computers, laptop computers, or any other type of mobile computing device such as cellular (smart) mobile phones (e.g., cell phones, also referred to as mobile phones), note pads, tablets, personal data assistant (PDA) devices, and other portable media devices. The collaboration clients 300(1) and 300(2) are software applications or plugins to a web browser running on the user devices 100 and 200, respectively, that enable the user devices 100, 200 to communicate with the collaboration server 400 and with each other through the collaboration server 400. More specifically, the collaboration clients 300(1) and 300(2) enable the user devices 100, 200 to communicate with the collaboration server 400 to host conversations including real-time communications and file sharing capabilities between user devices 100, 200.

The user devices 100, 200, collaboration server 400, and other devices of the collaboration system 10 can utilize any suitable operating systems to facilitate interaction, communications, exchanging media (e.g., audio and/or video) streams, and sharing of files between the various user devices 100, 200. In addition, the techniques described herein for managing the upload of files for file sharing between participants can be integrated with any suitable type of commercial software products of collaboration services that support online or web-based media communications between user devices 100, 200.

The collaboration system 10 facilitates communications and exchange of content between user devices 100, 200 and/or one or more collaboration servers 400 via any one or more suitable networks including, without limitation, any one or more of local or wide area networks, Internet Protocol (IP) networks such as intranet or internet networks, telephone networks (e.g., public switched telephone networks), wireless or mobile phone or cellular networks, and any suitable combinations thereof. The number of user devices 100, 200 and collaboration server 400 as depicted herein is merely for example purposes only, and it is noted that the network(s) connecting the user devices 100, 200 and collaboration server 400 can support communications and exchange of content between any suitable number of user devices and collaboration servers.

Further depicted in FIG. 1, the collaboration server 400 includes internal file storage 410. The internal file storage 410 may be any type of tangible storage device that can store data. The internal file storage 410 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the internal files storage 410 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device. The internal file storage 410 is configured to store any files or data that is uploaded to the collaboration server 400 from user devices 100, 200 via the collaboration clients 300(1) and 300(2) (or from other devices not shown in FIG. 1). The internal file storage 410 is further capable of storing file hashes for each of the files uploaded to the collaboration server 400 and stored on the internal file storage 410. The file hashes are stored in the file hashes database 420 of the internal file storage 410. The collaboration clients 300(1) and 300(2) are configured to calculate a file hash for any file uploaded to the collaboration server 400 prior to uploading the file to the collaboration server 400. The calculated the hash values of the uploaded files by the collaboration clients 300(1) and 300(2) may be of any bit length, e.g., SHA256 or SHA512 bits. Calculated hash values should have a significantly large bit value in order to have a sufficiently lower chance of collision. To further eliminate the chance of collision, the collaboration clients 300(1) and 300(2) may calculate two different hash values for the file using two different hash algorithms. For example, instead of the collaboration clients 300(1) and 300(2) calculating only a SHA256 hash value, the collaboration clients 300(1) and 300(2) may calculate and send to the collaboration server 400 a SHA256 hash value and a MD5 hash value for the file to be uploaded.

While not illustrated in FIG. 1, the collaboration server 400 may include an internal de-duper function and an external de-duper function. As will be further explained later, when a file hash is transferred to the collaboration server 400 by the collaboration clients 300, the internal de-duper function and external de-duper function submit queries with hash values matching those of the calculated file hash. The internal de-duper function submits a query to the file hash database 420 of the collaboration server 400, while the external de-duper function submits queries to the first connector service 500 (illustrated in FIGS. 1 and 2) and second connector service 700 (illustrated in FIG. 2).

The first service 600 may be any type of service that is suitable and capable of any type of file storage, such as, but not limited to, another collaboration service (e.g., Cisco WebEx, Citrix GoToMeeting), a file hosting service (e.g., Dropbox, Box), electronic mail service (e.g., Microsoft Exchange), instant messaging service (e.g., Cisco Jabber, Microsoft Lync), etc. The first service 600 may include a server similar to that of collaboration server 400, and may include the first file storage 610 that, similar to the internal file storage 410 of the collaboration server 400, may be any type of tangible storage medium that stores data and files. The first file storage 610 is further capable of storing file hashes for each of the files uploaded to the first service 600 and currently stored on the first file storage 610. The file hashes are stored in a first file hashes database 620.

The first connector service 500 facilitates communication between the collaboration server 400 and the first service 600. The first connector service 500 may be constructed with cooperation between the vendor or service provider that created and/or operates the first service 600 and the vendor or service provider that created and/or operates the collaboration server 400. In some instances, the vendor/service provider may have created and/or operates both the first service 600 and the collaboration system 10. An application program interface (API) may be provided that allows the collaboration server 400 to submit queries to the first service 600 in order to obtain files or data stored or accessible by the first file storage 610 of the first service 600. In other embodiments, the first connector service 500 may be a custom connector configured to utilize the existing APIs of the first service 600 to enable communication between the collaboration server 400 and the first service 600. For example, the collaboration server 400 may submit a query with a file hash to the first service 600 via the first connector service 500, where the query instructs the first service 600 to index the first file storage 610, which then attempts to index the first file hashes database 620 for a file hash with a matching value to that of the file hash sent by the collaboration server 400. The first service 600 may then be able to send a response back to the collaboration server 400 via the first connector service 500 indicating whether or not the first file hashes database 620 of the first service 600 contains a file hash with a matching file hash value. In the event the first service 600 finds a matching file hash value in the first file hashes database 620, the first service 600 may provide details to the collaboration server 400 via the first connector service 500 that enables the collaboration server 400 to use the file previously uploaded to, or otherwise already stored by, the first service 600 on the first file storage 610. For example, because the first service 600 and the collaboration server 400 are working together and cooperating with one another, the first service 600 may provide the collaboration server 400 with a link that provides direct access to the first file storage 610 of the first service 600. The first service 600 may provide to the collaboration server 400 a Uniform Resource Identifier (URI) that the collaboration server 400 may send to the collaboration clients 300(1) and 300(2) operated by the user devices 100, 200, respectively, for the user devices 100, 200 to download the file directly from the first file storage 610 of the first service 600. Because the first service 600 is a cooperating service, the URI sent to the collaboration clients 300(1) and 300(2) by the collaboration server 400 enables the collaboration clients 300(1) and 300(2) to directly access the files on the first file storage 610 of the first service 600.

Illustrated in FIG. 1 is a scenario in which a first user of the first user device 100 and a second user of the second user device 200 are collaborating with one another via the collaboration system 10, and the first user attempts to upload a file to share with the second user, but it is determined that the file that is to be uploaded has been previously uploaded to the first service 600. The collaboration client 300(1) being operated by the first user device 100 calculates a file hash value of the file to be uploaded from first user device 100 prior to the file actually being uploaded to the collaboration server 400. The collaboration client 300(1) then submits the calculated file hash value to the collaboration server 400 (arrow 1). The internal de-duper function of the collaboration server 400 indexes the internal file storage 410 of the collaboration server 400 (arrow 2) of the files previously uploaded to, and currently stored on, the internal file storage 410 of the collaboration server 400. The internal file storage 410 then attempts to index the file hashes database 420 for a file hash of a previously uploaded files that matches the value of the calculated file hash sent to the collaboration server 400 (arrow 3). In this scenario depicted in FIG. 1, a matching file hash to the file hash value received from the first user device 100 is not found in the file hashes database 420 of the collaboration server 400. Thus, the external de-duper function of the collaboration server 400 sends a query and/or the file hash to the first connector service 500 for a file hash value that matches the hash value of the file attempting to be uploaded (arrow 4). The first connector service 500 relays or transfers this query and/or the file hash to the first service 600 (arrow 5). The first service 600 indexes its own first file storage 610 of the files previously uploaded to, and currently stored on, the first file storage 610 (arrow 6). The first file storage 610 then attempts to index the first file hashes database 620 for a file hash value that matches the hash value of the file attempting to be uploaded (arrow 7). In this scenario, a match is found on the first file hashes database 620 of the first service 600. The first connector service 500 then informs the collaboration server 400 that a matching file hash has been found on the first file hashes database 620 of the first service 600, and provides a URI to the file data with the matching file hash value that is located on the first file storage 610 of the first service 600 (arrow 8). The collaboration server 400 notifies the collaboration client 300(1) on the first user device 100 that the "instant" file upload is complete and delivers to the collaboration client 300(2) operated by the second user device 200 the URI to the file data located on the first file storage 610 of the first service 600 (arrow 9). The collaboration client 300(2) follows the URI to retrieve the file data from the first file storage 610 of the first service 600 (arrow 10).

Figure 2:
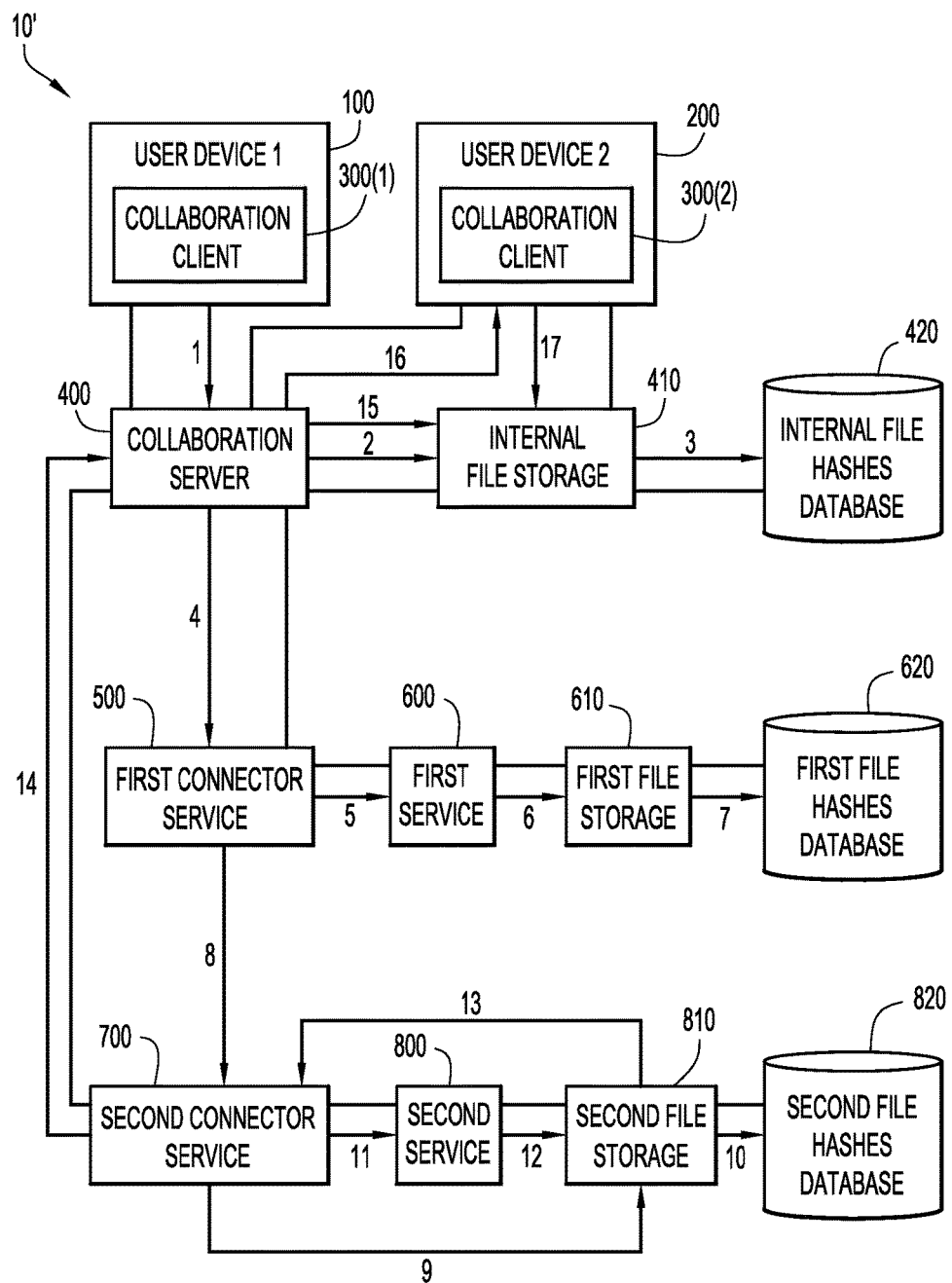
FIG. 2 is a schematic block diagram of an environment similar to FIG. 1 and showing a communication flow for file sharing according to a second example embodiment.

Referring first to FIG. 2, a second example embodiment of the collaboration environment/system is shown at reference numeral 10' is now described. The system 10' includes all of the components of system 10, and in addition, a second connector service 700 that is in turn in communication with a second service 800 (also referred to as a non-cooperating service"). The second service 800 is in communication with a second file storage 810 that includes a second file hashes database 820 that contains file hashes for files that are currently stored by the second file storage 810. The second file storage 810 and second file hashes database 820 are external to the collaboration server 400.

Similar to the first service 600, the second service 800 may be any type of service that is suitable and capable of any type of file storage, such as, but not limited to, another collaboration service (e.g., Cisco WebEx, Citrix GoToMeeting), a file hosting service (e.g., Dropbox, Box), electronic mail service (e.g., Microsoft Exchange), instant messaging service (e.g., Cisco Jabber, Microsoft Lync), etc. The second service 800 may include the second file storage 810 that may be any tangible storage facility that stores data and files. The second file storage 810 is further capable of storing file hashes for each of the files uploaded to the second service 800 and currently stored on the second file storage 810. The file hashes are stored in the second file hashes database 820.

The second connector service 700 facilitates communication between the collaboration server 400 and the second service 800. However, unlike the first service 600, the second service 800 may not be created and/or operated by vendor or service provider that is willing to "cooperate" with the vendor or service provider of the collaboration server 400. This may occur when the second service 800 is a legacy system or the vendor/service provider of the second service 800 is a competitor of the vendor/service provider that created and/or operates the collaboration system 10. Therefore, the second connector service 700 is configured as a custom connector that utilizes the existing API's of the second service 800 to enable communication between the collaboration server 400 and the second service 800. When the collaboration server 400 sends a query to the second service 800 via the second connector service 700, the second service 800 may then send a response to the collaboration server 400 via the second connector service 700 with an indication as to whether or not the second file hashes database 820 of the second service 800 contains a file hash having a matching file hash value. In the event the second file hashes database 820 of the second service 800 contains a matching file hash value, the second service 800 may notify the collaboration server 400, via the second connector service 700, that second file storage 810 of the second service 800 contains a file with a matching hash value. Because the second service 800 and the collaboration system 10 may not cooperate with one another like that of the relationship between the first service 600 and the collaboration server 400, the second service 800 may not provide external access to the files and data stored on the second file storage 810 of the second service 800. Thus, instead of the second service 800 providing the collaboration server 400 with a URI, or other similar manner for accessing the data and files on the second file storage 810, the second service 800 may require that the collaboration server 400 fetch the file with the matching hash value from the second file storage 810 of the second service 800 via a server-to-server communication. Thus, the file, or a copy of the file, is transferred from the second file storage 810 to the collaboration server 400 to be stored on the internal file storage 410 of the collaboration server 400.

As previously stated, illustrated in FIG. 2 is a scenario in which a first user of the first user device 100 attempts to upload a file to share with the second user of the second user device 200, and the file that is to be uploaded has been previously uploaded to, and is currently being stored by, the second service 800. The collaboration client 300(1) being operated by the first user device 100 calculates a file hash value of the filed to be uploaded prior to the file actually being uploaded to the collaboration server 400. The collaboration client 300(1) then submits the calculated file hash to the collaboration server 400 (arrow 1). The internal de-duper function of the collaboration server 400 indexes the internal file storage 410 of the collaboration server 400 (arrow 2) of the files previously uploaded to, and currently stored on, the internal file storage 410 of the collaboration server 400. The internal file storage 410 then attempts to index the file hashes database 420 for a file hash of a previously uploaded files that matches the value to the calculated file hash sent to the collaboration server 400 (arrow 3). In this scenario depicted in FIG. 2, a matching file hash is not found on the file hashes database 420 of the collaboration server 400. Thus, the external de-duper function of the collaboration server 400 sends a first query and/or the file hash to the first connector service 500 for a file hash value that matches the calculated file hash sent to the collaboration server 400 (arrow 4). The first connector service 500 relays or transfers this query and/or the file hash value to the first service 600 (arrow 5). The first service 600 indexes the first file storage 610 of the files previously uploaded to, and currently stored on, the first file storage 610 (arrow 6). The first file storage 610 then attempts to index the first file hashes database 620 for a file hash value that matches the calculated file hash value sent to the collaboration server 400 (arrow 7). However, different from the example embodiment illustrated in FIG. 1, a match is not found on the first file hashes database 620 of the first service 600.

Continuing with the example embodiment depicted in FIG. 2, the external de-duper function of the collaboration server 400 sends a second query and/or the file hash value to the second connector service 700 for a file hash value that matches the calculated file hash sent to the collaboration server 400 (arrow 8). The second connector service queries the second file storage 810 for files previously uploaded to, and currently stored on, the second file storage 810 (arrow 9). The second file storage 810 then attempts to index the second file hashes database 820 for a file hash value that matches the calculated file hash value sent to the collaboration server 400 (arrow 10). In this example embodiment depicted in FIG. 2, a match is found on the second file hashes database 820 of the second service 800. The second connector service 700 then sends a request to the second service 800 for the file data stored on the second file storage 810 (arrow 11). Because the second service 800 is a non-cooperating service, the second service 800 does not simply provide a URI, or other similar mechanism, to enable the collaboration server 400 to access the data and files of the second service 800. The second service 800 fetches the file data from the second file storage 810 (arrow 12) and delivers the file data to the second connector service 700 (arrow 13). The second connector service 700 then relays the file data to the collaboration server 400 (arrow 14). This transfer of the file data may be accomplished via a server-to-server communication. The collaboration server 400 then, either temporarily or permanently, stores the file data on the internal file storage 410 of the collaboration server 400 (arrow 15). The collaboration server 400 then notifies the collaboration client 300(1) on the first user device 100 that the "instant" file upload is complete and delivers to the collaboration client 300(2) operated by the second user device 200 a pointer to the file data stored on the internal file storage 410 (arrow 16). The collaboration client 300(2) operated by the second user device 200 follows the pointer to the internal file storage 410 to fetch the file data from the internal file storage 410 from the server 400 (arrow 17).

The scenarios depicted in FIGS. 1 and 2 may include more than a first service 600 and a second service 800. Any number of services may be queried for file hashes values that match the calculated file hash delivered to the collaboration server 400. Moreover, any number of cooperating services, similar to that of the first service 600, and any number of non-cooperating services, similar to that of the second service 800, may be queried. Having only a first service 600 and a second service 800, where the first service 600 is a cooperating service, and the second service 800 is a non-cooperating service, is for illustrative purposes only.

In addition, the collaboration server 400 is not limited to performing an internal de-duplication for a matching file hash value to that of the calculated file hash prior to querying external file storage systems. In other embodiments of the collaboration system 10, the collaboration server 410 may perform an external de-duplication and send queries to the connector services 500, 700 prior to performing an internal deduplication of a matching file hash. Furthermore, the collaboration server 400 is not limited to sending queries to cooperating services prior to sending queries to non-cooperating services. The collaboration server may send queries for matching file hash values in any order that is determined to be most efficient for the collaboration system 10.

While not depicted in the scenarios of FIGS. 1 and 2, in the event that a matching file hash value is not found on either the internal file storage 410 of the collaboration server 400, or first and second file storages 610, 810 of any of the external services 600, 800, then the file data of the file attempting to be uploaded to the collaboration server 400 from the collaboration client 300(1) operated by the first user device 300 will be uploaded from the first user device 100 to the collaboration server 400 to be stored, either temporarily or permanently, on the internal file storage 410 of the collaboration server 400. The collaboration server 400 may then deliver to the collaboration client 300(2) operated by the second user device 200 a pointer to the copy of the file stored on the internal file storage 410. The collaboration client 300(2) operated by the second user device 200 may then follows the pointer to fetch the copy of the file from the internal file storage 410 from the collaboration server 400.

Figure 3:
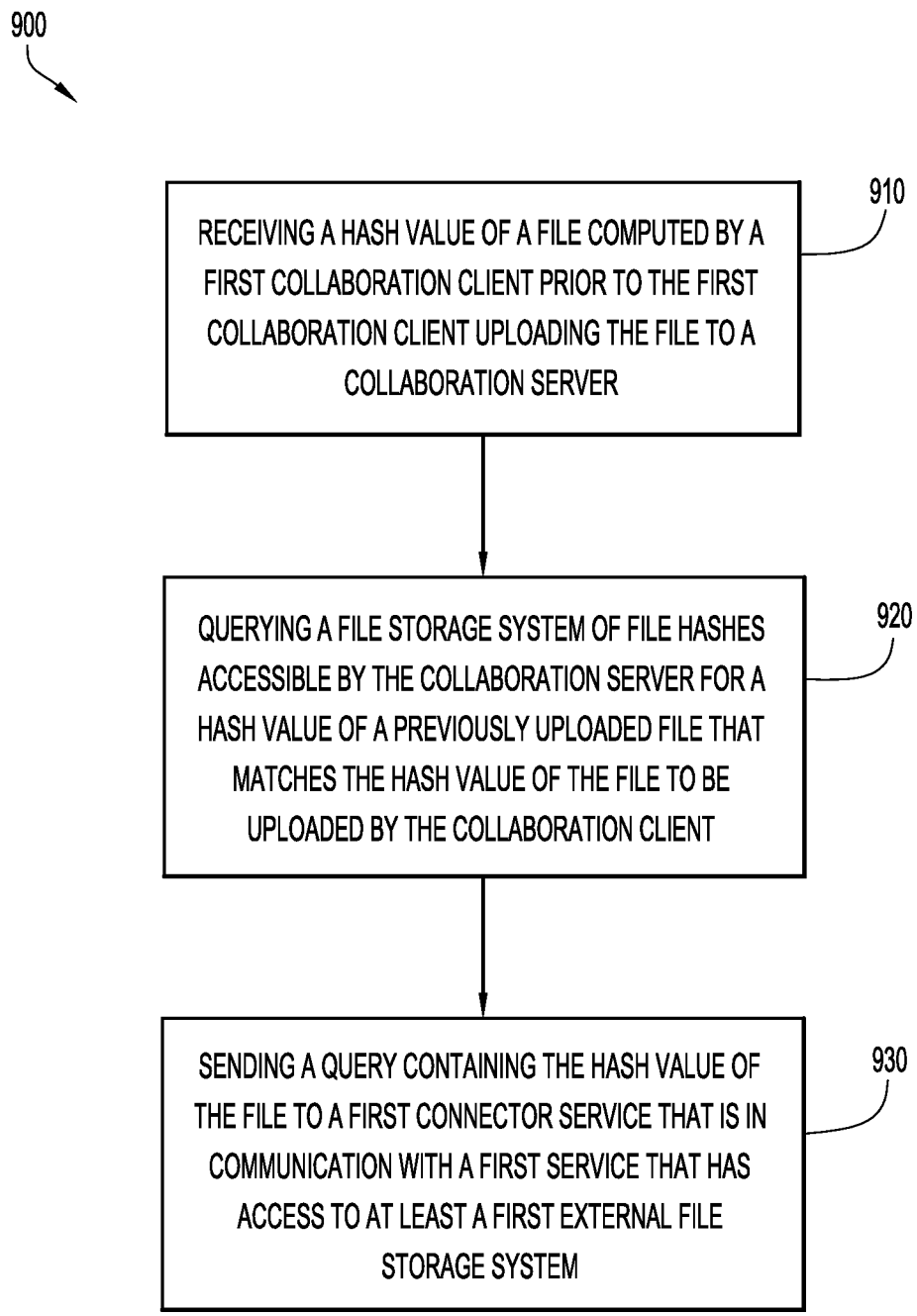
FIG. 3 is a flowchart depicting an example process for file sharing over a collaboration platform, according to an example embodiment.

An example embodiment of a process 900 performed by the collaboration server 400 for querying the various external services 600, 800 is depicted in the flowchart of FIG. 3. Reference is also made to FIGS. 1 and 2 for purposes of the description of FIG. 3. At 910, the collaboration server 400 receives a hash value of a file that is computed by the collaboration client 300(1) operated by the first user device 100 prior to the collaboration client 300(1) uploading the file to the collaboration server 400. At 920, the collaboration server 400 queries its internal file hashes database 420 for a hash value of a previously uploaded file that matches the hash value of the file to be uploaded by the collaboration client 300(1). As previously stated, the collaboration server 400 includes an internal file storage 410 that includes a file hashes database 420 of calculated file hash values for the files that have been previously uploaded to the collaboration server 400. At 930, the collaboration server 400 sends a query containing the file hash value of the file to be uploaded by the collaboration client 300(1) to a first connector service 500 that is in communication with the first service 600 that has access to at least a first file storage 610 that is external to the collaboration server 400. The first service 600 may include a first file storage 610 that includes a first file hashes database 620 of calculated file hash values for the files that have been previously uploaded to the first service 600. Sending the query to the first connector service 500 may be a result of a matching file hash value not being found in the file hashes database 420 of the collaboration server 400. In addition, the first service 600 may be a service that, as explained previously, is cooperating with the collaboration system 10 or may be a non-cooperating service.

After the collaboration server 400 sends a query to the first connector service 500, the collaboration server 400 may then receive a notification from the first connector service 500 that a matching hash value exists in the first file storage 610 of the first service 600. The notification from the first connector service 500 may include a link to the first service 600 that provides access to the file stored on the first file storage 610. The link may be a URI. The collaboration server 400 may then send the link the collaboration client 300(2) of the second user device 200. Conversely, the collaboration server 400 may also receive a notification from the first connector service 500 that a matching hash value does not exist in the first file storage 610. If the collaboration server 400 receives a notification from the first connector service 500 that a matching hash value does not exit, the collaboration server 400 may then send a query containing the hash value of the file to a second connector service 700 that is in communication with a second service 800 that has access to a second file storage 810 that is external to the collaboration server 400. The collaboration server 400 may then receive a notification from the second connector service 700 that a matching value exists in the second file storage 810. After receiving the notification from the second connector service 700, the collaboration server 400 may receive the file that is stored on the second file storage 810 from the second connector service 700. Once the collaboration server 400 receives the file from the second connector service 700, the collaboration server 400 may then store the file on the internal file storage 410 that is accessible by the collaboration server 400. Finally, the collaboration server 400 may then send a pointer to the file that is stored on the internal file storage 410 to the second collaboration client 300(2) to enable the second collaboration client 300(2) to obtain the file from the internal file storage 410 of the collaboration server 400.

The difference between the first service 600 and the second service 800 is that the first service 600 allows the collaboration client 300(2) on the second user device 200 to access to the first file storage 610 to obtain the file with the matching hash value, while the second service 800 does not allow the collaboration client 300(2) on the second user device 200 to access the second file storage 810 to obtain the file with the matching hash value from the second file storage 810. In the latter situation, the file needs to be obtained from the second file storage 810 by the collaboration server 400, which then provides it to the collaboration client 300(2).

Figure 4:
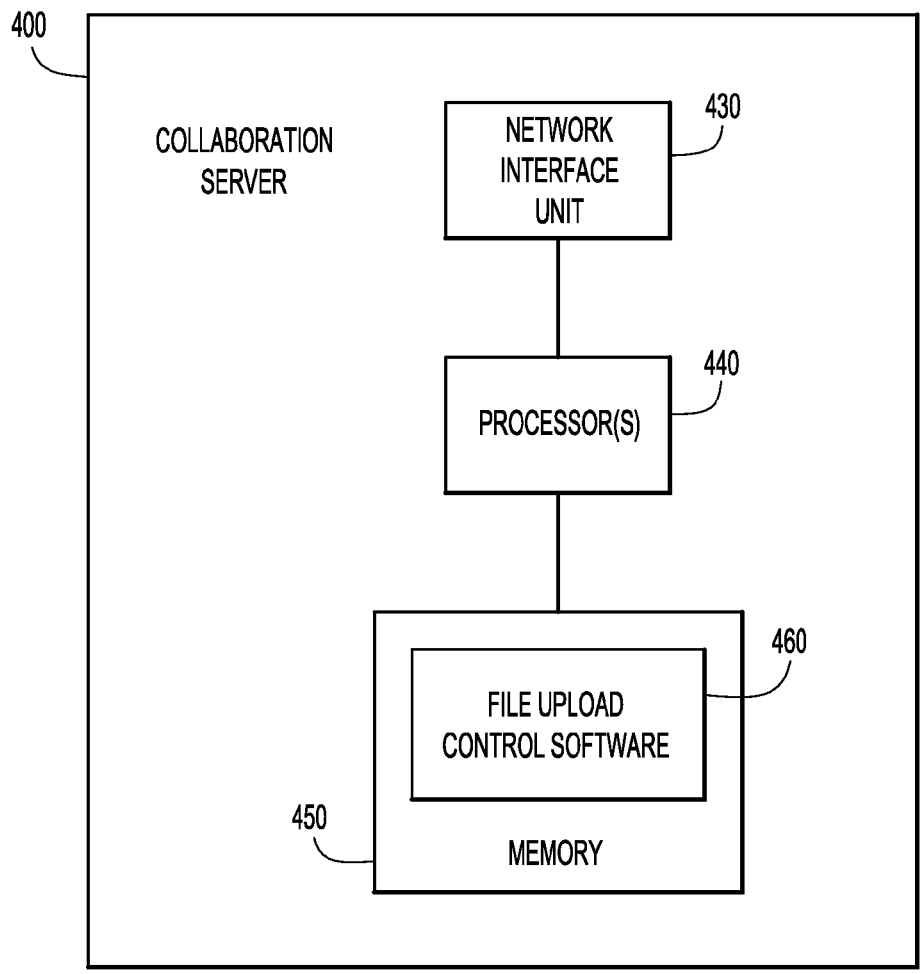
FIG. 4 is an example block diagram of the collaboration server illustrated in FIGS. 1 and 2, and configured to perform the methods presented herein, according to an example embodiment.

FIG. 4 illustrates an example block diagram of the collaboration server 400 configured to perform the techniques presented herein. The collaboration server 400 includes a network interface unit 430, a processor(s) 440, and a memory 450. The network interface unit 430 is configured to enable network communications over a network. While conceptually illustrated as a 'network interface unit,' it will be appreciated that a physical device may contain more than one network interface or type of interface to communicate with other devices within a network. For example, network interface unit 430 may comprise a wireless transceiver to facilitate wireless communication.

The processor(s) 440 may be embodied by one or more microprocessors or microcontrollers, and executes software instructions stored in memory 450 for file upload control software 460 in accordance with the techniques presented herein in connection with FIGS. 1-3. Thus, the file upload control software 460 may include instructions that cause the collaboration server 400 to perform the internal de-dupe function and external de-dupe function described above.

Memory 450 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 450 may include one or more tangible (e.g., non-transitory) computer readable storage media (e.g., a memory device) encoded with software comprising computer executable instructions, and when the software is executed by the processor(s) 440, the processor(s) 440 is operable to perform the operations described herein in connection with the file upload control software 460. In other approaches, file upload control software 460 is stored remotely, external to the collaboration server 400, but accessible by the processor(s) 440.

The functions of the processor(s) 440 may be implemented by logic encoded in one or more tangible computer readable storage media or devices (e.g., storage devices compact discs, digital video discs, flash memory drives, etc., and embedded logic such as an ASIC, digital signal processor instructions, software that is executed by a processor, etc.).

While FIG. 4 shows that the collaboration server 400 may be embodied as a dedicated physical device, it should be understand that the functions of the server 400 may be embodied as software running in a data center/cloud computing system, together with numerous other software applications.

As explained above, file sharing between users during a collaboration session that utilizes a collaboration system is a frequent and necessary feature of the collaboration system. However, frequent file uploads of a file by one user to be shared with the other users of a collaboration session requires a lengthy amount of time and is a major consumer of the bandwidth of the collaboration server hosting the collaboration system. Furthermore, it is often the case that the files to be uploaded have been previously uploaded to the collaboration server itself, or another server or file storage system of another service that the user devices have previously utilized.

The techniques presented herein provide a computer-implemented method of querying multiple services outside of the collaboration system for a file that matches the file that is attempting to be uploaded by one of the users. As discussed herein, the collaboration server not only queries its own internal file storage, but also queries services that are willing to cooperate with the collaboration system and services that are unwilling to cooperate with the collaboration system. When a user attempts to uploaded a file via the collaboration client of the collaboration server, the collaboration client calculates a hash value of the file and sends it to the collaboration server. The collaboration server then queries its own internal file storage and various external services for a matching file hash value. When a matching file hash value is found, the file data represented by the file hash value is presented to the other users of the collaboration system, and the user that attempted to upload the file is notified that an instant file upload has been completed.

The techniques presented herein may be used by a collaboration server in an attempt to both reduce the duration of the collaboration session by the users and to reduce the bandwidth necessary for file sharing. By reducing the time it takes to upload a file via the collaboration server, the collaboration session becomes more efficient, giving the users additional time to perform other tasks. Additionally, by reducing the bandwidth required for uploading files, the collaboration server is able to perform additional tasks that will improve the experience of the collaboration system for the users. The collaboration server may also dedicate more bandwidth to tasks that are already being performed to improve the experience of the collaboration system, such as improving the quality of the video and/or audio feeds.

In summary, in one form, a method is provided comprising: receiving a hash value of a file computed by a first collaboration client prior to the first collaboration client uploading the file to a collaboration server in an attempt to share the file with at least a second collaboration client; querying a file storage system of file hashes accessible by the collaboration server for a hash value of a previously uploaded file that matches the hash value of the file to be uploaded by the first collaboration client; and in response to not finding a matching hash value of the file in the file storage system, sending a query containing the hash value of the file to a first connector service that is in communication with a first service that has access to at least a first external file storage system.

In another form, an apparatus is provided comprising: a network interface unit configured to enable communications over a network; a memory; and a processor configured to: receive a hash value of a file computed by a first collaboration client prior to the first collaboration client uploading the file to a collaboration server in an attempt to share the file with at least a second collaboration client; query a file storage system of file hashes accessible by the collaboration server for a hash value of a previously uploaded file that matches the hash value of the file to be uploaded by the first collaboration client; and in response to not finding a matching hash value of the file in the file storage system, send a query containing the hash value of the file to a first connector service that is in communication with a first service that has access to at least a first external file storage system.

In still another form, one or more computer readable storage media are provided encoded with software comprising computer executable instructions, and when the software is executed, operable to: receive a hash value of a file computed by a first collaboration client prior to the first collaboration client uploading the file to a collaboration server in an attempt to share the file with at least a second collaboration client; query a file storage system of file hashes accessible by the collaboration server for a hash value of a previously uploaded file that matches the hash value of the file to be uploaded by the first collaboration client; and in response to not finding a matching hash value of the file in the file storage system, send a query containing the hash value of the file to a first connector service that is in communication with a first service that has access to at least a first external file storage system.

The above description is intended by way of example only. Various modifications and structural changes may be made therein without departing from the scope of the concepts described herein and within the scope and range of equivalents of the claims.

What is claimed is:

1. A method comprising:
   receiving, at a collaboration server, a hash value of a file computed by a first collaboration client prior to the first collaboration client uploading the file to the collaboration server in an attempt to share the file during a collaboration session with at least a second collaboration client;
   querying, by the collaboration server, an internal file storage system of file hashes of the collaboration server for a hash value of a first previously uploaded file that was uploaded to the internal file storage system prior to establishment of the collaboration session and that matches the hash value of the file to be uploaded by the first collaboration client;
   in response to not finding a matching hash value of the file in the internal file storage system, sending, by the collaboration server via a first application program interface, a query containing the hash value of the file to a first enterprise service that has access to at least a first external file storage system that is external to the collaboration server;
   receiving, at the collaboration server, via the first application program interface, a notification that indicates whether or not a matching hash value exists in the first external file storage system, if the notification indicates that a matching hash value exists, the notification includes a link to obtain access to a second previously uploaded file through the first enterprise service, the second previously uploaded file matching the hash value of the file to be uploaded;

in the event the notification indicates a matching hash value exists in the first external file system, sending, by the collaboration server, the link to the second collaboration client to enable the second collaboration client to directly access the second previously uploaded file on the first external file storage system of the first enterprise service; and in the event the link is sent to the second collaboration client, preventing, by the collaboration server, the first collaboration client from uploading the file.

2. The method of claim 1, wherein the link is a Universal Resource Identifier (URI).

3. The method of claim 1, further comprising:
receiving, at the collaboration server, a notification via the first application program interface that a matching hash value does not exist in the first external file storage system; and
sending, by the collaboration server via a second application program interface, a query containing the hash value of the file to a second enterprise service that has access to a second external file storage system that is external to the collaboration server.

4. The method of claim 3, further comprising:
receiving, at the collaboration server, a notification via the second application program interface that a matching value exists in the second external file storage system;
receiving, at the collaboration server, a third previously uploaded file from the second enterprise service, the third previously uploaded file matching the hash value of the file to be uploaded;
storing, by the collaboration server, the third previously uploaded file in the internal file storage system of the collaboration server; and
sending, by the collaboration server, to the second collaboration client a message containing a pointer to the third previously uploaded file in the internal file storage system to enable the second collaboration client to obtain the third previously uploaded file from the internal file storage system.

5. The method of claim 4, wherein the first enterprise service allows access to the second collaboration client to obtain the second previously uploaded file from the first external file storage system, and the second enterprise service does not allow access to the second collaboration client to obtain the third previously uploaded file from the second external file storage system.

6. The method of claim 1, further comprising:
receiving, at the collaboration server, a notification via the first application program interface that a matching value exists in the first external file storage system;
receiving, at the collaboration server, the second previously uploaded file from the first enterprise service;
storing, by the collaboration server, the second previously uploaded file in the internal file storage system of the collaboration server; and
sending, by the collaboration server, to the second collaboration client a message containing a pointer to the second previously uploaded file in the internal file storage system to enable the second collaboration client to obtain the second previously uploaded file from the internal file storage system.

7. The method of claim 3, further comprising:
receiving, at the collaboration server, a notification via the second application program interface that a matching hash value does not exist in the second external file storage system;
receiving, at the collaboration server, the file from the first collaboration client; and
sending, by the collaboration server, to the second collaboration client a message containing a pointer to the file in the internal file storage system to enable the second collaboration client to obtain the file from the internal file storage system.

8. An apparatus comprising:
a network interface unit configured to enable communications over a network;
a memory; and
a processor configured to:
receive, at a collaboration server, a hash value of a file computed by a first collaboration client prior to the first collaboration client uploading the file to the collaboration server in an attempt to share the file during a collaboration session with at least a second collaboration client;
query, by the collaboration server, an internal file storage system of file hashes of the collaboration server for a hash value of a first previously uploaded file that was uploaded to the internal file storage system prior to establishment of the collaboration session and that matches the hash value of the file to be uploaded by the first collaboration client;
in response to not finding a matching hash value of the file in the internal file storage system, send, by the collaboration server via a first application program interface, a query containing the hash value of the file to a first enterprise service that has access to at least a first external file storage system that is external to the collaboration server;
receive, at the collaboration server, a notification via the first application program interface that indicates whether or not a matching hash value exists in the first external file storage system, if the notification indicates that a matching hash value exists, the notification includes a link to obtain access to a second previously uploaded file through the first enterprise service;
in the event the notification indicates a matching hash value exists in the first external file system, send, by the collaboration server, the link to the second collaboration client to enable the second collaboration client to directly access the second previously uploaded file on the first external file storage system of the first enterprise service; and
in the event the link is sent to the second collaboration client, prevent, by the collaboration server, the first collaboration client from uploading the file.

9. The apparatus of claim 8, wherein the link is a Universal Resource Identifier (URI).

10. The apparatus of claim 8, wherein the processor is further configured to:
receive, at the collaboration server, a notification via the first application program interface that a matching hash value does not exist in the first external file storage system; and
send, by the collaboration server via a second application program interface, a query containing the hash value of the file to a second enterprise service that has access to a second external file storage system that is external to the collaboration server.

11. The apparatus of claim 10, wherein the processor is further configured to:
receive, at the collaboration server, a notification via the second application program interface that a matching value exists in the second external file storage system;
receive, at the collaboration server, a third previously uploaded file from the second enterprise service, the third previously uploaded file matching the hash value of the file to be uploaded;
store, by the collaboration server, the third previously uploaded file in the internal file storage system of the collaboration server; and
send, by the collaboration server, to the second collaboration client a message containing a pointer to the third previously uploaded file in the internal file storage system to enable the second collaboration client to obtain the third previously uploaded file from the internal file storage system.

12. The apparatus of claim 11, wherein the first enterprise service allows access to the second collaboration client to obtain the second previously uploaded file from the first external file storage system, and the second enterprise service does not allow access to the second collaboration client to obtain the third previously uploaded file from the second external file storage system.

13. The apparatus of claim 8, wherein the processor is further configured to:
receive, at the collaboration server, a notification the first application program interface that a matching value exists in the first external file storage system;
receive, at the collaboration server, the second previously uploaded file from the first enterprise service;
store, by the collaboration server, the second previously uploaded file in the internal file storage system of the collaboration server; and
send, by the collaboration server, to the second collaboration client a message containing a pointer to the second previously uploaded file in the internal file storage system to enable the second collaboration client to obtain the second previously uploaded file from the internal file storage system.

14. The apparatus of claim 10, wherein the processor is further configured to:
receive, at the collaboration server, a notification via the second application program interface that a matching hash value does not exist in the second external file storage system;
receive, at the collaboration server, the file from the first collaboration client; and
send, by the collaboration server, to the second collaboration client a message containing a pointer to the file in the internal file storage system to enable the second collaboration client to obtain the file from the internal file storage system.

15. One or more computer readable storage media encoded with software comprising computer executable instructions, and when the software is executed, operable to:
receive, at a collaboration server, a hash value of a file computed by a first collaboration client prior to the first collaboration client uploading the file to the collaboration server in an attempt to share the file during a collaboration session with at least a second collaboration client;
query, by the collaboration server, an internal file storage system of file hashes of the collaboration server for a hash value of a first previously uploaded file that was uploaded to the internal file storage system prior to establishment of the collaboration session and that matches the hash value of the file to be uploaded by the first collaboration client;
in response to not finding a matching hash value of the file in the internal file storage system, send, by the collaboration server via a first application program interface, a query containing the hash value of the file to a first enterprise service that has access to at least a first external file storage system that is external to the collaboration server;
receive, at the collaboration server, a notification the first application program interface that indicates whether or not a matching hash value exists in the first external file storage system, if the notification indicates that a matching hash value exists, the notification includes a link to obtain access to a second previously uploaded file through the first enterprise service, the second previously uploaded file matching the hash value of the file to be uploaded;
in the event the notification indicates a matching hash value exists in the first external file system, send, by the collaboration server, the link to the second collaboration client to enable the second collaboration client to directly access the second previously uploaded file on the first external file storage system of the first enterprise service; and
in the event the link is sent to the second collaboration client, prevent, by the collaboration server, the first collaboration client from uploading the file.

16. The computer readable storage media of claim 15, wherein the instructions are further operable to:
receive, at the collaboration server, a notification via the first application program interface that a matching hash value does not exist in the first external file storage system; and
send, by the collaboration server via a second application program interface, a query containing the hash value of the file to a second enterprise service that has access to a second external file storage system that is external to the collaboration server.

17. The computer readable storage media of claim 16, wherein the instructions are further operable to:
receive, at the collaboration server, a notification via the second application program interface that a matching value exists in the second external file storage system;
receive, at the collaboration server, a third previously uploaded file from the second enterprise service, the third previously uploaded file matching the hash value of the file to be uploaded;
store, by the collaboration server, the third previously uploaded file in the internal file storage system of the collaboration server; and
send, by the collaboration server, to the second collaboration client a message containing a pointer to the third previously uploaded file in the internal file storage system to enable the second collaboration client to obtain the third previously uploaded file from the internal file storage system.

18. The computer readable storage media of claim 17, wherein the first enterprise service allows access to the second collaboration client to obtain the second previously uploaded file from the first external file storage system, and the second enterprise service does not allow access to the second collaboration client to obtain the third previously uploaded file from the second external file storage system.

19. The computer readable storage media of claim 15, wherein the instructions are further operable to:
- receive, at the collaboration server, a notification via the first application program interface that a matching value exists in the first external file storage system;
- receive, at the collaboration server, the second previously uploaded file from the first enterprise service;
- store, by the collaboration server, the second previously uploaded file in the internal file storage system of the collaboration server; and
- send, by the collaboration server, to the second collaboration client a message containing a pointer to the second previously uploaded file in the internal file storage system to enable the second collaboration client to obtain the second previously uploaded file from the internal file storage system.

20. The computer readable storage media of claim 16, wherein the instructions are further operable to:
- receive, at the collaboration server, a notification via the second application program interface that a matching hash value does not exist in the second external file storage system;
- receive, at the collaboration server, the file from the first collaboration client; and
- send, by the collaboration server, to the second collaboration client a message containing a pointer to the file in the internal file storage system to enable the second collaboration client to obtain the file from the internal file storage system.

\* \* \* \* \*